April 12, 1949.   H. T. SUMMA   2,466,918
TRACTION DEVICE
Filed June 5, 1947
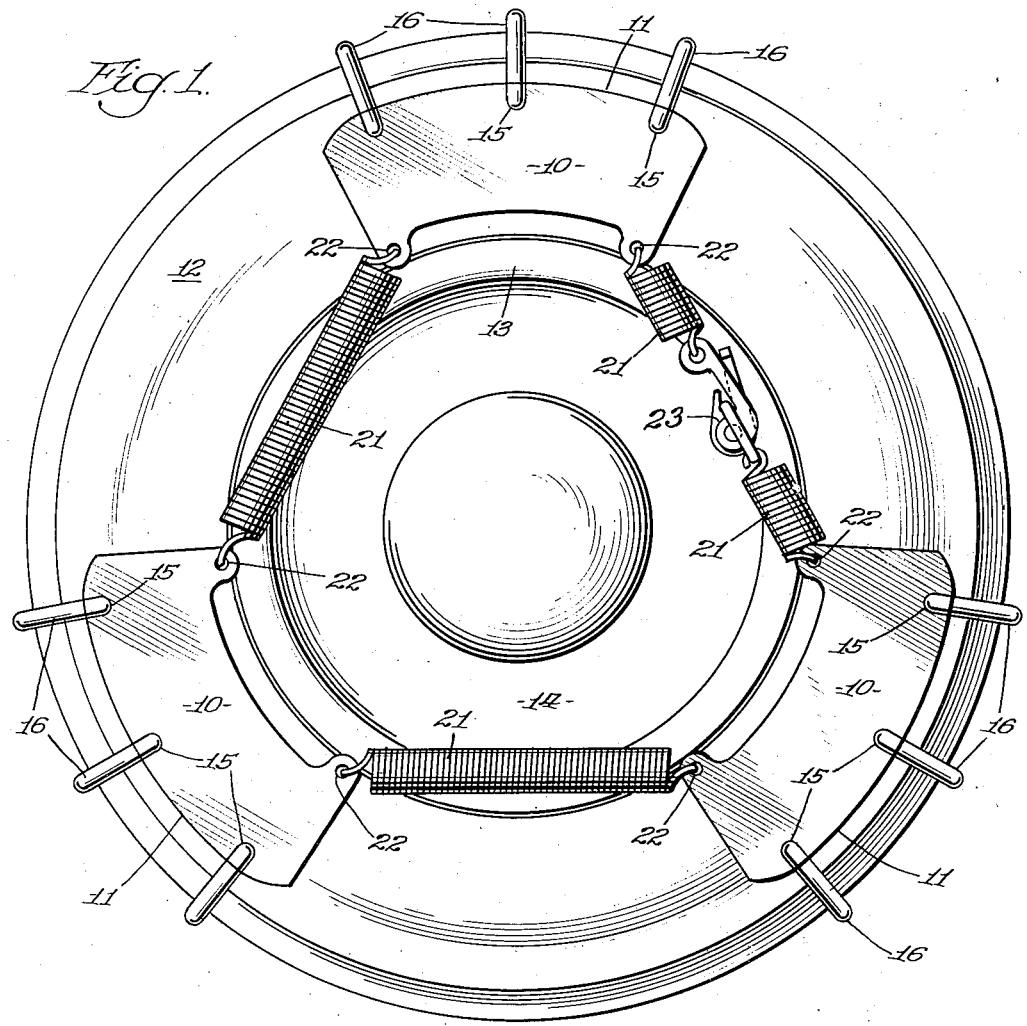
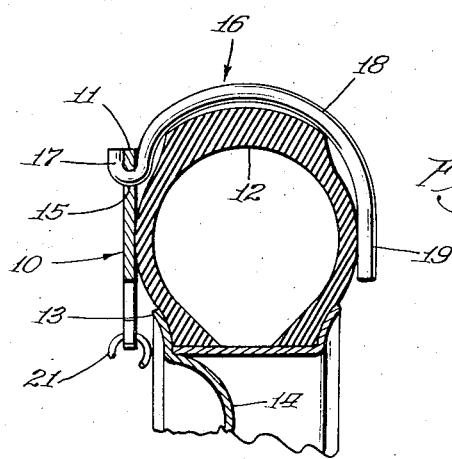
INVENTOR.
Henry T. Summa
BY
L. F. Hammand
Atty Patented Apr. 12, 1949

2,466,918

UNITED STATES PATENT OFFICE 2,466,918

TRACTION DEVICE

Henry T. Summa, Evanston, Ill.

Application June 5, 1947, Serial No. 752,611

7 Claims. (Cl. 152—225)

1

The present invention relates to a traction device for attachment to wheels of a vehicle to prevent slippage of the wheels in mud, soft ground, snow, ice, etc., and more particularly to a new and improved traction device which is highly efficient, is of simple, durable and economical construction, and can be easily and quickly attached to and removed from a vehicle wheel.

Ordinary tire chains include a pair of side chains adapted to be fitted around the entire circumference of the tire with a number of cross chains extending across the tire tread. They require fastening on both the inside and the outside of the tire, and may be applied to a wheel only by hoisting or jacking up the wheel to fasten the chains in place on the tire, or by placing the chains flat on the ground and moving the vehicle so that the wheel rests on the cross chains, and then fastening both the inner and outer side chains circumferentially around the tire. To remove such conventional chains, it is necessary to hoist or jack up the wheel to release the cross chains, or to unfasten the side chains, place them flat on the ground and then move the vehicle so as to run the wheel off the cross links.

The attachment and removal of such chains has long been recognized as one of the most difficult and troublesome tasks ordinarily encountered by motorists. Particularly is this true when it is necessary to place chains on a wheel that has become mired in soft mud or deep snow, since although it is necessary to fasten the chain on the inner side of the tire as well as on the outside, the inside point of fastening may be so inaccessible that it is impossible to perform the task without ruining one's clothing.

In addition to the continuous type chains, there have been used various types of mud hooks or single-unit chains which are fastened through the spokes of the wheel to extend transversely of the tire at a single point of its circumference, but the usefulness of these devices is limited since they cannot be used with disc wheels or on wheels on which the space between the brake drum and the rim is too small to permit the chain to pass through. Furthermore, the individual hooks or chains must be attached to and removed from the wheel separately. This requires a series of operations which take considerable time.

Applicant is aware that various types of traction devices have been devised in an effort to overcome these known disadvantages of conventional structures, but it is submitted that none of the prior devices have successfully combined

2 qualities of efficiency with a simple or economical construction, and consequently do not have the advantages of applicant's present invention.

It is the primary object of the present invention to overcome the deficiencies of prior tire chains and traction devices by providing a novel traction device which is highly efficient and simple, fits the tire snugly, which may be quickly and easily attached to and removed from a wheel and which requires fastening on one side only of the wheel.

It is a further object of this invention to provide a traction device which can be economically and inexpensively manufactured and assembled.

A further object is to provide a traction device which can be quickly and easily attached to a vehicle wheel which is mired or stuck in mud, soft ground or deep snow.

The foregoing objects are accomplished in the present invention by the provision of a plurality of relatively flat side-plates positioned circumferentially of the tire in spaced apart relationship on the outer side wall of the tire, with a plurality of lugs or mud-hooks mounted on each of said plates and having traction portions extending transversely across the tire tread. The side plates are held in position by the lugs and by coil springs or other tension means connecting the side plates. Various embodiments of the invention may be made without departing from the teachings here set out, but a preferred form of the invention has been illustrated in the drawings in which:

Figure 1 is a side elevational view of a traction device constructed according to the principles of this invention, the device being illustrated in operating position on a vehicle wheel.

Figure 2 is a detail sectional view taken substantially on the plane of line 2—2 of Figure 1.

The traction device includes a plurality of traction elements, together with means for securing them in a position on the tire tread. As shown, it consists of a plurality of mounting elements 10, each of which may be a flat sheet metal plate having an arcuate outer edge 11 formed with a radius somewhat less than the radius of the wheel so that the outer edge of the plates will lie along the sidewall of the tire 12, but will be clear of the tread. The width of the plates may be varied within limits, but satisfactory results are obtained by forming them of a width so that their inner edge is positioned adjacent to the rim 13 of the wheel 14.

Each of the plates 10 include a number of perforations 15 close to the arcuate outer edge 11 but spaced apart from each other to establish proper spacing for the lugs 16 that form the traction elements of the device. Each of the lugs 16 includes a hooked portion 17 shaped to engage one of the perforations 15 to permit limited pivotal movement of the lugs with respect to the plate. Each lug also includes an arcuate portion 18 extending transversely across the tread of the tire and an inwardly extending end portion 19 shaped to bear against the inner sidewall of the tire at a point directly opposite the mounting plate.

The mounting plates 10 are secured in position on the tire by tension elements extending between them. In the prefererd construction these are coil springs 21 which extend between the opposite ends of each of the mounting plates and a detachable coupling 23 is provided so that the device can be attached to or removed from the wheel conveniently. The perforations or eyelets 22 afford means for securing the tension elements to the plates.

Any convenient number of plates may be utilized, but it is contemplated that excellent results are obtained by the use of three plates, each provided with three lugs equally spaced. This gives ample traction for all ordinary circumstances, yet establishes a sufficient spacing between the individual mounting plates so that they can be applied to the tire without lifting the wheel from the ground or moving the vehicle.

When my device is attached to a wheel, the side plates or mounting elements 10 are held in position against the outer sidewall of the tire by means of the lugs or mud hooks 16 and the coil springs 21. The mud hooks or lugs are held in snug engagement with the tire and the side plates are prevented from rocking by reason of the fact that the two springs attached to each of the side plates are secured thereto at points near the opposite ends of the plates and widely separated about the circumference of the tire. The loose mounting of the lugs in the side plates permit slight movement circumferentially of the tire and gives the lugs enough play so that they may creep along the tread. This function is aided by the springs, the tension of which will permit enough play so that when the vehicle is in operation the entire traction device may move gradually and advance around the circumference of the tire, to evenly distribute the wear.

To attach my traction device to a wheel, one of the side plates 10 is placed in position on the top of the wheel, with the lugs carried thereon extending across the tire tread. The other side plates are then placed in the positions shown and the coupling 23 fastened. It will be seen that this is a very simple and quick operation and can be easily accomplished even though the wheel is mired or stuck.

To remove the device, it is necessary only to open the coupling 23 and remove the side plates and lugs.

It is also apparent that my traction device may be attached to and removed from a wheel from one side only of the wheel. The jacking up of the vehicle or the moving of the vehicle are unnecessary, either in the attachment or removal. The device fits the wheel and tire snugly, and is, consequently, quiet in operation, either in soft mud or on hard surfaced pavement, so that the objectionable rattling and noise of conventional chains is avoided.

The form of the invention illustrated in the drawings and described herein is the present preferred embodiment of these teachings but certain departures may be made from the exact structure shown without sacrifice of all of the advantages therein. It is accordingly pointed out that the scope of the invention is not limited to the exact construction and arrangement of parts shown in the drawings but extends to any variations or modifications coming within the terms of the appended claims.

Having thus described my invention, what I claim as new and desire to protect by United States Letters Patent is:

1. In a traction device for a vehicle wheel, the combination of a plurality of side plates adapted to be circumferentially spaced about the outer side wall of the tire, a plurality of lugs independently mounted on each of said side plates, each lug having an arcuate portion adapted to extend transversely across the tire tread, and an inwardly extending end portion adapted to bear against the inner side wall of the tire at a point opposite the mounting plate; and tension means extending between said side plates.

2. A traction device for a vehicle wheel comprising a plurality of side plates adapted to be positioned circumferentially on the outer wall of the tire in spaced apart relationship, tension means extending between said side plates, the two tension means adjacent each side plate being secured to the side plate at points spaced apart and adjacent the opposite ends of the plate, together with a plurality of lugs independently mounted on each of said side plates, each of said lugs being adapted to extend transversely across the tire tread and an inwardly extending end portion adapted to bear against the inner side wall of the tire at a point opposite the mounting plate.

3. A traction device for a vehicle wheel comprising, in combination, a plurality of side plates adapted to be positioned circumferentially on the outer side wall of the tire in spaced apart relation, a plurality of separate and independent lugs mounted on each of said side plates; each lug having arcuate portions adapted to extend transversely across the tire tread and to the tire wall opposite said mounting elements, means for securing a tension member at each end of said side plates, and coil springs secured to and extending between said means.

4. In a traction device for a vehicle wheel, the improvement that resides in the provision of a plurality of mounting elements adapted to be spaced circumferentially on the outer side wall of the tire, with a plurality of lugs independently mounted on each of said mounting elements and extending transversely across the tire tread; each of said lugs being mounted for independent limited pivotal movement with respect to its mounting element.

5. A traction device for a vehicle wheel comprising, in combination, a plurality of relatively thin flat arcuately formed mounting plates adapted to lie against the side wall of the vehicle tire; with a plurality of lug mounting holes near its outer edge and eyelets near the opposite end of its inner edge a plurality of rigid lug members mounted for limited pivotal movement in the mounting holes on each of said plates, each of said lugs including a traction portion adapted to extend transversely across the tire tread and an inwardly extending end portion adapted to bear against the inner side wall of the tire at a point opposite the mounting plate; together with a plurality of coil springs extending between the individual mounting plates to secure the plates and lug members in position on the vehicle tire, one of said coil springs having a quickly detachable coupling to permit easy attachment and removal of the device on a wheel.

6. A traction device for a vehicle wheel comprising, in combination, a plurality of mounting elements, each of said mounting elements consisting of a relatively thin flat plate adapted to lie against the side wall of the vehicle tire, with a generally arcuate outer edge and an inner edge adjacent the rim of the wheel; a plurality of openings spaced apart from each other and adjacent to the arcuate edge of the plate, a traction member independently mounted for limited pivotal movement in each of said openings, each of said traction members comprising a hook portion extending through the opening in the plate and an arcuate portion adapted to extend transversely across the tire tread: together with means for securing a pair of tension members at the opposite ends of each of said mounting plates, and a plurality of tension elements extending between the individual plates to secure all of the plates and traction members in position on the vehicle tire, one of said tension elements including a quickly detachable coupling to permit easy attachment and removal of the device on a wheel.

7. A traction device for a vehicle wheel comprising, in combination, a plurality of mounting elements, each of said mounting elements consisting of a relatively thin flat plate adapted to lie against the side wall of the vehicle tire, with a generally arcuate outer edge concentric with the circumference of the tire but of lesser radius than the radius of the tire tread and an inner edge adjacent the rim of the wheel: a plurality of openings spaced apart from each other and adjacent to the arcuate edge of the plate, a traction member mounted in each of said openings, each of said traction members comprising a hook portion extending through the opening in the plate, an arcuate portion adapted to extend transversely across the tire tread and an inwardly extending end portion adapted to bear against the inner side wall of the tire at a point opposite the mounting plate; means for securing a pair of tension members at the opposite ends of each of said mounting plates and near their inner edges; together with a plurality of tension elements extending between the individual plates to secure all of the plates and traction members in position on the vehicle tire.

HENRY T. SUMMA.

REFERENCES CITED

The following references are of record in the file of this patent:

UNITED STATES PATENTS

| Number | Name | Date |
|---|---|---|
| 1,204,919 | Wightman | Nov. 14, 1916 |
| 1,391,721 | Deuel | Sept. 27, 1921 |
| 1,517,994 | Kegel | Dec. 2, 1924 |
| 2,290,398 | Wellington | July 21, 1942 |